March 26, 1929.　　S. S. JENKINS　　1,706,491
COMBINED DIPPING, COOKING, AND ARTICLE HOLDING APPARATUS
Filed July 5, 1927　　2 Sheets-Sheet 1
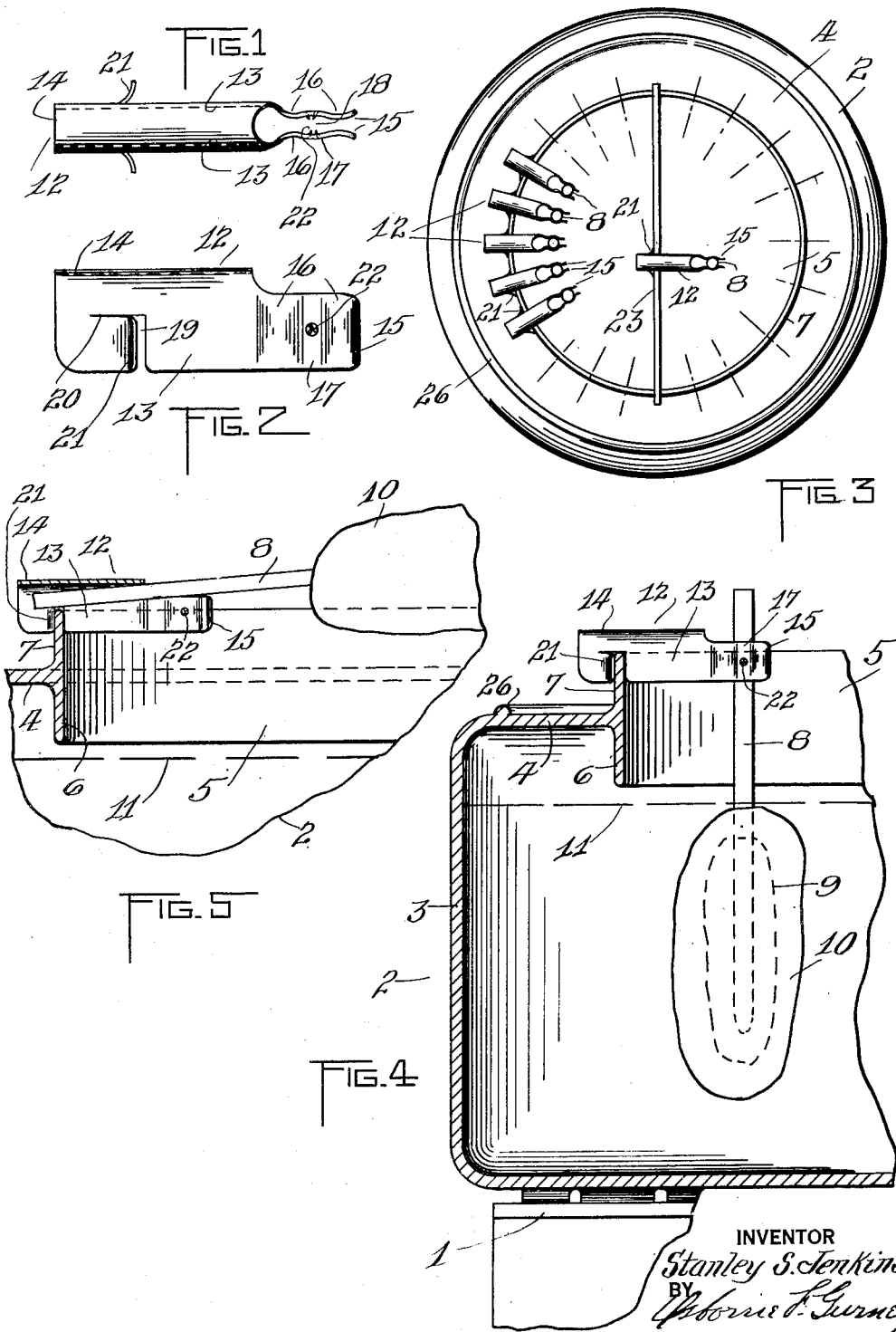
INVENTOR
Stanley S. Jenkins
BY
ATTORNEY March 26, 1929.  S. S. JENKINS  1,706,491
COMBINED DIPPING, COOKING, AND ARTICLE HOLDING APPARATUS
Filed July 5, 1927  2 Sheets-Sheet 2
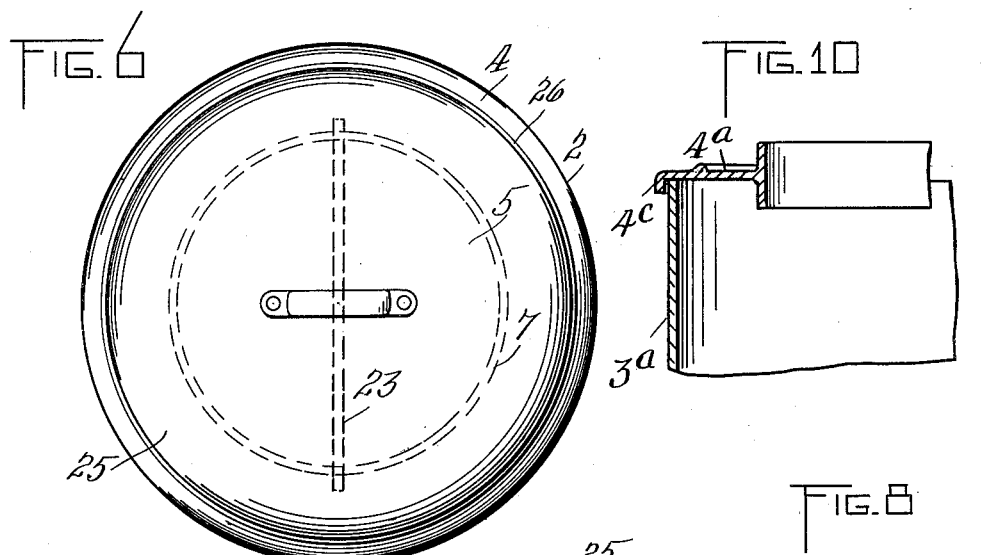
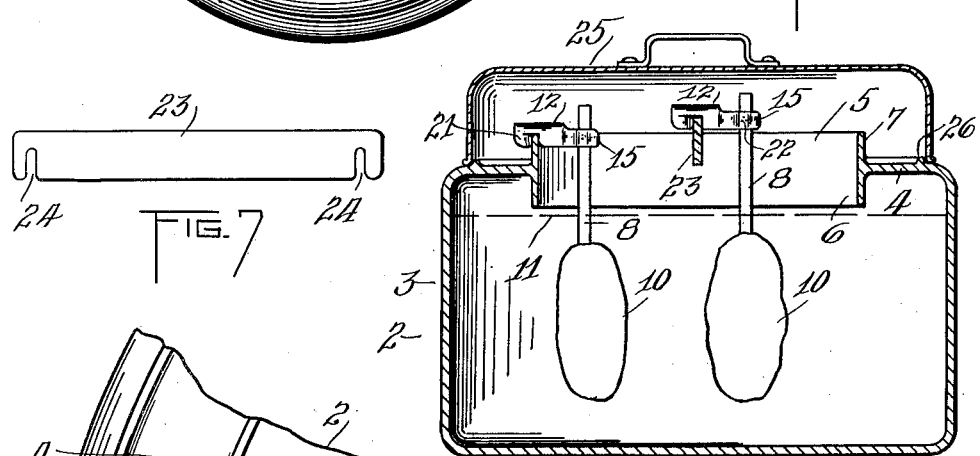
INVENTOR
Stanley S. Jenkins
BY
his ATTORNEY Patented Mar. 26, 1929.

1,706,491

UNITED STATES PATENT OFFICE.

STANLEY S. JENKINS, OF BUFFALO, NEW YORK.

COMBINED DIPPING, COOKING, AND ARTICLE-HOLDING APPARATUS.

Application filed July 5, 1927. Serial No. 203,332.

The present invention relates to cooking vessels and more particularly to an apparatus in which a new and novel edible food product may be deep fried, such product forming subject matter of a copending application Serial No. 198,225, and consisting of an article of food impaled on a stick and coated with batter, an object of the invention being to employ such sticks as means co-operating with devices forming part of the apparatus to hold the batter jacketed food articles immersed in the liquid cooking medium while the batter is being cooked, and thereafter to hold the articles in proximity to the surface of the liquid so as to be kept warm until served.

I have discovered that articles of food such, for instance, as wieners, boiled ham, hard boiled eggs, cheese, sliced peaches, pineapples, bananas and like fruit, and cherries, dates, figs, strawberries, etc., when impaled on sticks and dipped in a batter, which includes in its ingredients a self rising flour, and then deep fried in a vegetable oil at a temperature of about 390° F., the resultant food product on a stick for a handle is a clean, wholesome and tasty refreshment; and to provide a simple, inexpensively constructed and sanitary apparatus for cooking such food products in quantities is a further object of the invention.

It is preferable that the several sticks on which the encased food articles are impaled be independently supported, and to this end it is a further object of the invention to provide a clip or holding means of novel and inexpensive construction, one that is removably supported on a rim of a kettle without the use of fastening devices and which is sanitary both in the simplicity of its construction and that it may readily be removed and cleaned by dropping it in hot water.

And, a still further object of the invention is to provide a vessel for the purpose set forth from which the cooking oil will not spatter, and having provision for keeping out dust and other extraneous matter, retaining heat and confining odors.

To these and other ends the invention consists of an apparatus as will be fully set forth in the following description and particularly defined in the appended claims.

The accompanying drawings illustrating the invention are as follows:

Figures 1 and 2 are top and side views, respectively, of one of the stick holding clips.

Fig. 3 is a top plan view of the apparatus with some of the clips removed and their positions on the rim of the vessel indicated by broken center lines, the cover also being removed.

Fig. 4 is a sectional view on the line 4—4, Fig. 9, the cooking vessel being shown as resting upon a burner.

Fig. 5 is a fragmentary sectional detail on the line 5—5, Fig. 9.

Fig. 6 is a top plan view of the apparatus with its cover in place but with the stick holding clips removed.

Fig. 7 is a detail view in side elevation of the bridge piece shown in dotted lines in Fig. 6.

Fig. 8 is a vertical sectional view of the apparatus showing a stick holding clip on the rim of the vessel and another on the bridge piece.

Fig. 9 is an enlarged fragmentary plan view of the apparatus showing two of the clips and sticks held thereby, one of the sticks having the article thereon in position for cooking, while the other is in the position which it assumes when the article is horizontally suspended above the cooking medium.

And, Fig. 10 is a sectional view in side elevation of a modification of the vessel showing a removable cover with a downwardly turned circumferential flange.

In the drawings similar reference numerals refer to similar parts throughout the several views.

As hereinabove stated one of the purposes of the invention is to provide an apparatus in which a quantity of batter coated edible articles on spits or sticks may be immersed in a liquid cooking substance and held therein with the free or handle ends of the sticks extending above the surface of the liquid so as to afford means for readily and individually removing the articles by hand. To this end there is provided any suitable open top vessel adapted to rest upon a burner as indicated at 1 in Fig. 4. A vessel, of the type which I prefer to use, is indicated by the numeral 2 and has its side wall 3 turned inwardly at the top to form an annular top portion 4 which surrounds an opening 5. The wall of this opening 5 projects below the plane of the top 4 to form a baffle 6 which with the top portion 4 prevents the oil from spattering, and such wall also projects upwardly to form a rim 7 on which stick holding clips are supported.

As will be observed the sticks 8, on which the food articles 9 coated with batter 10 are impaled, function both as means for suspending the coated articles in the cooking medium and, also, as handles for holding the articles while being eaten.

In order to hold the sticks 8 with their free ends extending above the surface of the liquid substance 11 in the vessel 2, any suitable releasably engaging means on or adjacent the rim 7 may be employed. As a simple, practical and inexpensive means for this purpose I prefer to make use of clips 12 which are placed in spaced relation on the rim 7 and extend radially thereof.

Each clip 12 is formed in one piece from spring metal and comprises a blank which is doubled upon itself to form spaced side walls 13 the inner or forward ends of which project beyond the bend or connecting portion 14 to form spring arms 15. Opposing portions 16 of these arms are curved inwardly from the planes of their respective side walls 13, while portions 17 intermediate adjacent inwardly curved portions 16 are curved outwardly thus forming an opening 18 the walls of which yieldably engage a stick 8 and hold it in a vertical position and at any desired position of adjustment. The side walls 13 are slotted upwardly at 19 from the lower edges and rearwardly as at 20 so that opposing side wings 21 may be bent outwardly therefrom and to permit the clip to be placed on the rim 7 in the manner clearly indicated in the drawings, the inner walls of the slits 19 bearing against the inner face of the rim 7 while the wings 21 yieldably bear against the outer face of such rim, thus yieldably and removably holding the clip in place.

When immersing the article in the liquid 11, the ends of the spring arms 15 of a clip 12 are forced apart by the stick 8 as it is moved into the opening 18 where it is held in a vertical position. The stick is yieldingly held in place by the spring arms of the clip but its position may be adjusted so as to hold the article thereon at any desired depth in the liquid or the article may be raised entirely out of the liquid providing the relative length of the stick, height of the side wall of the vessel and depth of the liquid are such as to permit it. It will also be observed that the irregular or zig-zag formation of the spring arms 15 will be determined by the cross sectional shape of the sticks to be held thereby and need not necessarily be curved, as illustrated. The tendency of the food product is to float in the cooking oil and to hold it submerged the wall portions 17 of the clips 12 are formed with inwardly turned serrations along their top or bottom edges or, as indicated, with holding points or prongs 22 pressed inwardly from the body portions for the purpose of gripping the stick on which the product is impaled and holding it against axial movement. With the stick held in substantially a true vertical position the batter 10, which when applied to the article 9 is in a semi-fluid condition, is prevented from flowing to one side which would cause the cooked product to be lopsided.

After the product has been cooked the stick 8 on which it is impaled is removed from the spring arms 15 and, if the article is not immediately served, the holder or stick 8 is extended under the bend 14 of the clip and caused to rest upon the top edges of the inwardly curved portions 16 of the arms 15 as a support, the edible product thus being suspended horizontally above the level of the liquid 11 with the weight thereof holding the free end of the stick upwardly against the bend 14.

In order to increase the capacity of the apparatus a bridge piece 23 may be extended diagonally across the opening 5, such member comprising a bar of flat stock having slots 24 adjacent its ends which receive the rim 7, whereby the bar is supported edgewise on the rim 7. And, as shown in Figs. 3 and 7, clips 12 may be placed on the bridge piece.

For the purposes of retaining heat, confining odors, preventing oil from spattering, and keeping dust and other extraneous matter out of the cooking oil, a cover 25 is provided. This cover is dished so that its top is spaced above the free ends of the sticks 8 and the edge of the side wall is seated around a bead 26 on the top portion 4 of the vessel.

From the foregoing it will be observed that I have provided a simple apparatus whereby articles impaled on sticks may be suspended in a liquid substance which may be a cooking oil, providing the article is one to be cooked, or a coating medium if the article is merely to be dipped therein; that the article may be suspended above the liquid either in a vertical or a horizontal position; that the free ends of the sticks on which the articles are impaled may at all times be grasped by the fingers for handling the articles; that an article holding clip of novel construction has been provided, and that these clips are held in place without the use of fastening devices and may readily be removed so that they and the cooking vessel may be easily washed. It may also be added that the batter 10 swells when being cooked and is thoroughly cooked in about one and one-half minutes with the oil at a temperature of approximately 390° F; that the crust is crispy and well browned; that the amount of oil absorbed by the batter is practically nil; and that the general appearance of the food product is that of a cruller on a stick. If the encased article is a wiener or other partly cooked food, it becomes thoroughly cooked with the batter; if the article is fruit the flavor is not destroyed but rather the juice of the fruit flavors the surrounding pastry.

Although the apparatus is intended for use primarily for deep frying batter jacketed food articles impaled on sticks, it will readily be understood that it may also be used for dipping articles impaled on sticks in a liquid coating substance.

In Fig. 10 there is shown a modification of the vessel in which the top wall 4ᵃ comprises a removable cover resting upon the edge of the side wall 3ᵃ and having a downwardly turned circumferential flange 4ᵇ. With this construction the fluid substance may readily be poured from the vessel and the parts easily cleaned.

What I claim is:

1. In an apparatus for dipping an edible article impaled on a stick, a vessel for containing the substance into which the article is to be dipped, and means on a wall of the vessel for releasably holding the stick at different angular positions in a vertical plane.

2. In an apparatus for dipping edible articles impaled on sticks, a vessel for containing the substance into which the articles are to be dipped, and means carried by a wall of the vessel for yieldingly and releasably holding the sticks independently at different angular positions in vertical planes.

3. In an apparatus of the character described, a clip comprising a blank of spring material doubled longitudinally upon itself to form side walls and a connecting bend, said walls extending beyond the bend at one end to form a pair of spring arms, and wings pressed outwardly from the side walls in rear of said arms, for the purpose specified.

4. In an apparatus of the character described, a clip comprising a blank of spring material doubled longitudinally upon itself to form side walls and a connecting bend, said walls extending beyond the bend at one end to form a pair of spring arms portions of which are pressed inwardly from the planes of the side arms and the top edges of the arms being below said bend, and wings pressed outwardly from the side arms, all substantially as and for the purpose set forth.

5. In an apparatus of the character described, the combination with an open top vessel, of a stick holding clip, means on the clip for yieldingly and removably holding it on a rim of the vessel, means on said clip for holding the stick in a substantially vertical position, and additional means on the clip for slidingly holding the stick in a horizontal position.

6. In an apparatus of the character described, the combination with an open top vessel, of a stick holding clip, means on the clip for yieldingly and removably holding it on a rim of the vessel, and means on said clip for holding the stick in a substantially vertical position, said last named means being formed to hold the stick against axial movement.

7. The combination, in an apparatus of the character described, of an open top vessel, a stick holding clip comprising a blank of sheet material doubled upon itself to form spaced side walls and a connecting bend, extensions from said side walls beyond one end of said bend comprising spring arms formed to hold the stick in a substantially vertical position, the top edges of said arms being below said bend, the arms and said connecting bend co-operating to form a holding means for said stick in a substantially horizontal position, and wings pressed outwardly from said side walls in rear of said arms to form vertical slot openings permitting the clip to be placed on a rim of the vessel, said wings and inner walls of said slot openings engaging said rim to yieldingly hold the clip thereon.

8. The combination with an open top vessel of a clip, means on the clip for releasably holding it on the rim of the vessel, and additional means on the clip for yieldingly suspending a stick in the manner and for the purpose set forth.

9. The combination with an open top vessel of the character and for the purpose set forth, of a rim surrounding the opening, and a bridge member for spanning said opening, said bridge member having slots adjacent its ends for receiving said rim to hold the bridge member in place.

STANLEY S. JENKINS.